US008001833B2

(12) United States Patent
Delp

(10) Patent No.: US 8,001,833 B2
(45) Date of Patent: Aug. 23, 2011

(54) METHOD FOR DETERMINING THE TRAPPING EFFICIENCY AND/OR A SCAVENGING AIR MASS OF AN INTERNAL COMBUSTION ENGINE

(75) Inventor: Matthias Delp, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 386 days.

(21) Appl. No.: 12/208,083

(22) Filed: Sep. 10, 2008

(65) Prior Publication Data

US 2009/0070009 A1 Mar. 12, 2009

(30) Foreign Application Priority Data

Sep. 12, 2007 (DE) ........................ 10 2007 043 440

(51) Int. Cl.
*G01M 15/00* (2006.01)

(52) U.S. Cl. .................................................... 73/114.31

(58) Field of Classification Search ................ 73/114.31
See application file for complete search history.

(56) References Cited

U.S. PATENT DOCUMENTS

| | | | | |
|---|---|---|---|---|
| 5,819,693 | A * | 10/1998 | Curtil | 123/65 E |
| 6,519,513 | B2 * | 2/2003 | Nakagawa et al. | 701/22 |
| 6,659,076 | B2 * | 12/2003 | Kato | 123/305 |
| 7,000,589 | B2 * | 2/2006 | Matthews et al. | 123/350 |
| 7,213,550 | B2 * | 5/2007 | Nishida | 123/90.15 |
| 7,275,516 | B1 * | 10/2007 | Cunningham et al. | 123/305 |
| 7,296,550 | B2 * | 11/2007 | Trask et al. | 123/179.18 |
| 7,318,342 | B2 * | 1/2008 | Boehm et al. | 73/114.42 |
| 7,597,092 | B2 * | 10/2009 | Eser et al. | 123/676 |
| 7,664,594 | B2 * | 2/2010 | Kojima | 701/113 |

FOREIGN PATENT DOCUMENTS

| | | |
|---|---|---|
| DE | 10 2005 027 470 A1 | 1/2006 |
| DE | 10 2004 030 605 B3 | 2/2006 |
| DE | 10 2004 041 708 A1 | 3/2006 |

* cited by examiner

*Primary Examiner* — Freddie Kirkland, III

(74) *Attorney, Agent, or Firm* — King & Spalding L.L.P.

(57) ABSTRACT

A method for determining the trapping efficiency and/or a scavenging air mass of an internal combustion engine has the steps of: for operating points (BP), in which a scavenging of a cylinder of the internal combustion engine with air takes places, an efficiency curve ($\eta_{KL}$, $\eta_{KL,M1}$) of the internal combustion engine is created as a function of an injection mass ($m_K$) of fuel in the cylinder, and on the basis of the efficiency curve ($\eta_{KL}$, $\eta_{KL,M1}$) an optimum injection mass ($m_{K,opt}$) for an optimum efficiency ($\eta_{opt,1}$) of the internal combustion engine is determined, which is a measure for the trapping efficiency and/or a measure for the scavenging air mass of the internal combustion engine.

20 Claims, 2 Drawing Sheets

METHOD FOR DETERMINING THE TRAPPING EFFICIENCY AND/OR A SCAVENGING AIR MASS OF AN INTERNAL COMBUSTION ENGINE

CROSS-REFERENCE TO RELATED APPLICATIONS

This application claims priority to German application number 10 2007 043 440.7 filed Sep. 12, 2007, the contents of which are hereby incorporated by reference in its entirety.

TECHNICAL FIELD

The invention relates to a method for determining the trapping efficiency and/or a scavenging air mass of an internal combustion engine, for operating points of the internal combustion engine in which scavenging of a cylinder of the internal combustion engine with air takes place.

BACKGROUND

With internal combustion engines with supercharging, especially turbocharging, at low engine revolutions and thus with low mass throughflows in the exhaust system, what is referred as turbo lag occurs. In this operating range efficiency of the turbocharger is low and a relatively low torque of the internal combustion engine is produced at full throttle. The turbo lag can be reduced by scavenging the cylinder or the cylinders of the internal combustion engine.

During the scavenging fresh air is flushed through a cylinder of the internal combustion engine into its exhaust system. In this case, for operating points of the internal combustion engine in which scavenging is taking place, a degree of delivery—i.e. for a given capacity of the internal combustion engine a ratio of actual fresh air remaining in the cylinder after a change of charge to a theoretically possible filling of the cylinder with fresh air—can no longer be determined in a conventional manner.

It is in fact not known how much of the total air has passed through the cylinder and how much remains in the cylinder. For optimum or almost optimum operation of the internal combustion engine it is thus necessary to know a mass or a volume of scavenging air or to determine a trapping efficiency of the relevant cylinder which is a measure of how much fresh air from the scavenging air remains in the cylinder.

A mass or a volume of air which flows into the internal combustion engine can be detected by measurement, e.g. by means of an air mass meter. A mass or volume of air, which flows from an induction manifold of the internal combustion engine into the relevant cylinder, is mostly model-based and determined with the assistance of pressure sensors in the induction manifold for example.

However the air mass or air volume remaining in the cylinder after scavenging of the cylinder is relevant for torque generation of the internal combustion engine and thus also for formation of a mixture in the cylinder. The air mass remaining in the cylinder is modeled with the aid of the trapping efficiency (mostly designated by $\alpha$) in order to compute the torque of the internal combustion engine and thus be able to control or regulate it. In addition the air mass or volume remaining in the relevant cylinder is used to compute a currently required fuel mass or volume.

In the prior art the trapping efficiency and/or the scavenging air mass or volume of the relevant cylinder of the internal combustion engine is determined by an exhaust gas analysis and/or an offline charging change calculation with low and high pressure indicating.

SUMMARY

An improved method for determining a trapping efficiency and/or an improved method for determining a scavenging mass or volume an internal combustion engine during scavenging of a cylinder of the internal combustion engine can be provided.

According to an embodiment, a method for determining a trapping efficiency and/or a scavenging air mass of an internal combustion engine, may comprise the steps of: for operating points in which a scavenging of a cylinder of the internal combustion engine occurs, creating an efficiency curve of the internal combustion engine as a function of an injection mass in the cylinder, and on the basis of the efficiency curve, determining an optimum injection mass at an optimum efficiency of the internal combustion engine, which is a measure of the trapping efficiency and/or a measure of the scavenging air mass of the internal combustion engine.

According to a further embodiment, the optimum efficiency of the internal combustion engine can be an extreme, especially the absolute maximum, of the efficiency curve. According to a further embodiment, the efficiency curve of the internal combustion engine can be created for a specific speed of the internal combustion engine. According to a further embodiment, for the relevant optimum operating point of the internal combustion engine, an air mass contained in the cylinder can be calculated by the optimum injection mass. According to a further embodiment, for the relevant optimum operating point of the internal combustion engine, an optimum Lambda value can be computed through the optimum injection mass. According to a further embodiment, the scavenging air mass of the internal combustion engine can be determined from a difference between the air mass flowing into the cylinder and an air mass contained in the cylinder. According to a further embodiment, the trapping efficiency of the internal combustion engine can be determined from a ratio of the air mass contained in the cylinder and air mass flowing into the cylinder or the scavenging air mass. According to a further embodiment, air mass flowing into the cylinder can be determined by a sensorin particular model-based and by a pressure sensor. According to a further embodiment, the efficiency curve of the internal combustion engine can be created as a function of a variable parameter of the internal combustion engine. According to a further embodiment, the efficiency curve of the internal combustion engine can be created as a function of an output of the internal combustion engine. According to a further embodiment, the efficiency curve of the internal combustion engine can be created as a function of a Lambda value of the internal combustion engine. According to a further embodiment, the efficiency curve of the internal combustion engine can be created on the basis of a torque generated by the internal combustion engine. According to a further embodiment, the efficiency curve of the internal combustion engine can be generated as a function of a torque generated by the internal combustion engine and an optimum torque of the internal combustion engine. According to a further embodiment, the optimum torque of the internal combustion engine can be defined as an optimum Lambda value for the optimum operating point. According to a further embodiment, the Lambda value and/or the optimum Lambda value of the internal combustion engine may vary depending on the operating point of the internal combustion engine. According to a further embodiment, the internal combustion engine may comprise a supercharger in particular a turbocharger or a compressor. According to a further embodiment, the internal combustion engine may comprise a device for variable activation of an inlet valve and/or a device for variable activation of an exhaust valve.

BRIEF DESCRIPTION OF THE DRAWINGS

The invention is explained in a more detail below on the basis of exemplary embodiments which refer to the enclosed drawing. The drawing shows the following.

DETAILED DESCRIPTION

Figure 1:
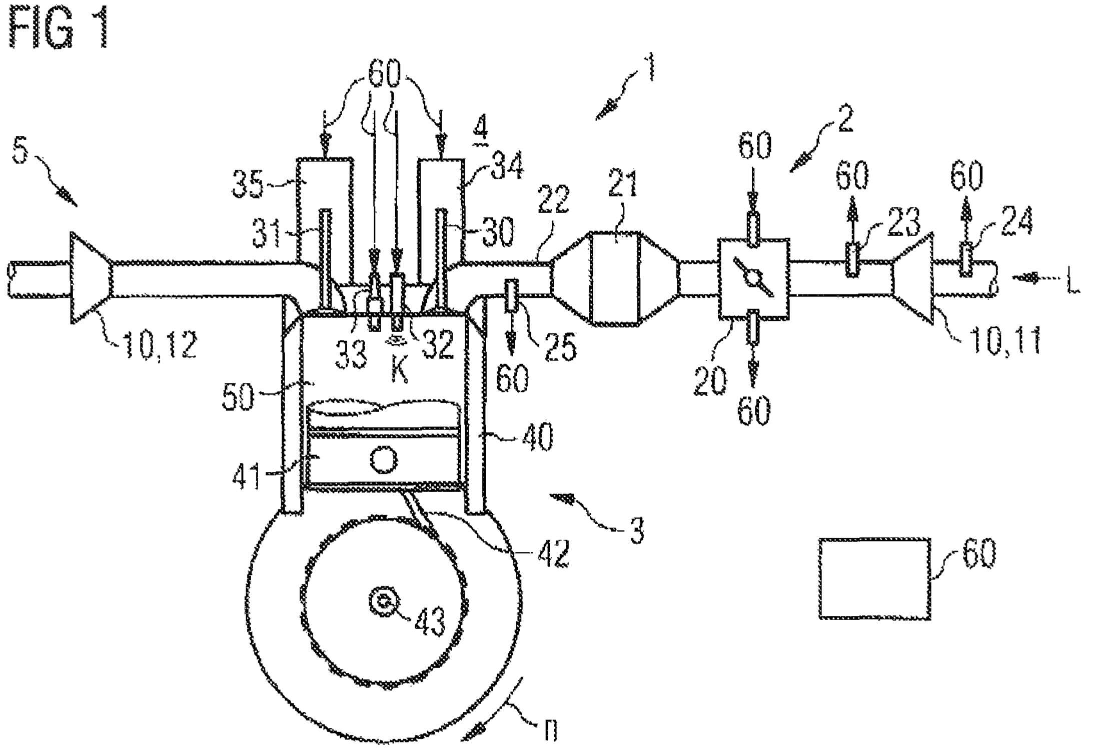
FIG. 1 in a schematic diagram of a supercharged internal combustion engine of a motor vehicle, with an inlet and an exhaust tract.

According to various embodiments, a method is designed to use simple means reliably to determine the air mass or volume available in the cylinder and/or the air mass or volume scavenged through said cylinder. The method is especially designed to dispense with expensive exhaust gas measurement technology and/or a complex and expensive indicating measurement technology.

When this document refers to a mass (air mass, injection mass, fuel mass, etc.) this should also be taken to include the term volume, since a respective mass and a respective volume have a specific relationship to each other. Furthermore, when this document refers to a cylinder of an internal combustion engine, this should also be taken to include the term plurality of cylinders of the internal combustion engine.

In the method, a mass of fresh air remaining in a cylinder of the internal combustion engine is determined with the aid of an efficiency of the internal combustion engine. Preferably this may concern a mechanical efficiency of the internal combustion engine which is oriented to an output of the internal combustion engine. This can for example be a torque or power of the internal combustion engine. It is however also possible to use other efficiencies, such as a process efficiency, with the method according to an embodiment.

According to an embodiment an efficiency curve is created for a specific engine speed of the internal combustion engine. In this case the method is repeated until such time as all necessary speeds of the internal combustion engine have been covered. This relates especially to those speeds of the internal combustion engine, in which scavenging of a cylinder of the internal combustion engine with air takes place or can take place. Preferably the method in accordance with an embodiment can be employed for all possible speeds of the internal combustion engine, with there being a need to ensure a sensible classification of the speeds.

The efficiency curve, which is generated as a function of a fuel mass to be injected into a cylinder, is made up of operating points of the internal combustion engine. Consideration of the efficiency curve allows an optimum or highest efficiency of the internal combustion engine to be determined.

The respective optimum or highest efficiency of the internal combustion engine is assigned an optimum injection mass which is a measure of the trapping efficiency and/or a measure of the scavenging air mass of the cylinder. On the basis of the optimum injection masses read off, the respective trapping efficiency and/or the respective scavenging air mass of the cylinder can be determined or calculated, provided the volume of air flowing from the induction manifold into the cylinder is known.

This can be preferably done with reference to of a model and/or with the aid of a sensor, especially of a pressure sensor. An air mass sensor can also be considered as a sensor, with model creation being able to be dispensed with here.

Preferably an air mass contained in the cylinder or a prevailing optimum Lambda value obtaining in the cylinder at that moment can be initially calculated with reference to the optimum injection mass. According to various embodiments, the scavenging air mass of the internal combustion engine is produced from a difference between the air mass flowing into the cylinder and the air mass remaining in the cylinder for combustion. The relevant trapping efficiency of the internal combustion engine is computed from a ratio of the air mass contained in the cylinder and the air mass flowing into the cylinder or the air mass leaving the cylinder (scavenging air mass).

According to various embodiments, the efficiency curve is created as a function of a variable parameter of the internal combustion engine. A Lambda value or also a fuel mass or volume is typically suitable for this purpose.

According to various embodiments, the efficiency curve of the internal combustion engine is determined such that a torque generated by the internal combustion engine is determined via a Lambda value to be varied of the internal combustion engine. I.e. a dependency of the torque of the internal combustion engine is recorded via a Lambda value.

With a very rich mixture (Lambda value $\lambda<1$) the torque efficiency is low. With a weakening of the mixture down to an optimum point the efficiency improves and reaches its maximum at the optimum point. With a further weakening the torque-efficiency gets worse again. In this way a Lambda efficiency curve is obtained according to an embodiment.

This is initially determined at known operating points of the internal combustion engine without residual gas content (preferable in such cases: Camshaft without valve overlap and/or without scavenging). According to various embodiments, a torque efficiency curve is now likewise determined for those operating points with a scavenging of the cylinder through a variation of the injection masses.

This again allows a highest or optimum torque of the internal combustion engine to be determined for operating points scavenging of the cylinder. This means that the injection mass is also known for this highest or optimum torque. According to various embodiments, these two characteristic curves can now be synchronized, since it is now known which Lambda value exists in the relevant combustion chamber: Instantaneous optimum Lambda value, which for the operating points with scavenging mostly lies at $0.85\pm0.1$.

With a knowledge of the injection mass the air mass (fresh air mass) currently contained in the cylinder of the internal combustion engine can be calculated. From a difference between the inflowing air mass (preferably model-based computation) and the air mass remaining in the cylinder, the scavenging air mass flowing out of the cylinder is produced.

According to various embodiments, the method is employed for internal combustion engines having a supercharging facility or device, preferably an exhaust gas turbocharger or a compressor. In addition it can be preferred that the internal combustion engine features a device for variable activation of an inlet and/or an exhaust valve.

It is however possible to apply the various embodiments to internal combustion engines without a supercharging facility or device. Furthermore the method according to various embodiments can be applied to internal combustion engines which do not feature any facility for variable activation of the inlet and/or exhaust valve(s).

Preferably the method according to various embodiments can be executed on an engine test bench. According to various embodiments, this allows the relevant operating points, characteristic curves and engine maps to be established for the scavenging operating state, and the corresponding engine map to be adapted for the engine management device, so that, in later operation of the internal combustion engine, this is also operated at optimum efficiency at those operating points in which a scavenging of the cylinders has taken place some time before.

With the method according to various embodiments, expensive exhaust gas measurement technology and/or expensive a complex indicating measurement technology can be dispensed with. The method in accordance may be implemented with a standard motor test bed structure. According to various embodiments, only a brake, a fuel balancing system and an air mass meter are needed in order to determine the trapping efficiency and/or the scavenging air mass of the internal combustion engine for the operating points scavenging of the internal combustion engine.

The invention is explained in greater detail below with reference to an internal combustion engine with one cylinder embodied as an otto or as a diesel engine. In this case the internal combustion engine has a exhaust gas turbocharger as well as a device for variable activation of an inlet valve and a device for variable activation of an exhaust valve. The invention is not however intended to be restricted to such an internal combustion engine, but is to relate entirely generally to internal combustion engines.

Such internal combustion engines, instead of an exhaust gas turbocharger, can have another supercharging facility or device, such as a compressor for example. In addition it is possible to apply the invention to internal combustion engines which do not have any supercharging facility and/or any device for variable activation of an inlet/exhaust valve. And naturally the method according to various embodiments is able to be applied to internal combustion engines which possess a plurality of cylinders.

Furthermore if the test below refers to an optimum value, e.g. an optimum torque, of the internal combustion engine, this is also intended to include the term maximum or highest value i.e. highest motor torque for example.

FIG. 1 shows a internal combustion engine 1 with a cylinder 40, which includes an inlet tract 2, an engine block 3, a cylinder head 4 and an exhaust tract 5.

The inlet tract 2 preferably may have a throttle flap 20, a collector 21 and an induction manifold 22 which is routed via an inlet channel in the engine block 3 to the cylinder 40. The induction tract 2 also preferably may feature a compressor 11 of a supercharging facility 10 which compresses the air L in the induction tract 2.

In the exemplary embodiment shown the compressor 11 is a compressor 11 of a turbocharger 10, especially that of an exhaust gas turbocharger 10, of which the turbine 12, preferably its exhaust gas turbine 12, is provided in the exhaust tract 5. A shaft which connects the turbine 12 to the compressor 11 is not shown in the drawing.

Preferably upstream of the compressor 11 the induction tract 2 may comprise a temperature sensor 24 which measures a temperature of the inflowing fresh air L, preferably an outside temperature, and makes a corresponding signal available to a control device 60. Preferably a air measurement system/sensor 23 can be located between the compressor 11 and the throttle flap 20, which measures an inflowing air mass $m_L$ and issues a corresponding signal to the control device 60.

The induction tract 2, in the area of the induction manifold 22, also features a sensor 25, by means of which an air mass $m_{L,40}$,ein can be determined, which flows from the induction manifold 22 into the cylinder 40. To this end the sensor 25 may preferably be embodied as a pressure sensor 25, with the air mass $m_{L,40,ein}$ flowing into the cylinder 40 being able to be determined with the aid of a model in the control device 60 together with the pressure information, which the pressure sensor 25 sends to the control device 60. Alternatively an air mass sensor 25 can be used.

The engine block 3 features a crankshaft 43 which is mechanically coupled via a connecting rod 42 to a piston 41 of the cylinder 40.

The cylinder head 4 of the internal combustion engine 1 includes valve gear with gas exchange valves 30, 31—preferably at least one inlet valve 30 and preferably at least one exhaust valve 31—as well as valve actuating mechanisms assigned to said valves (not shown in the drawing), which preferably may be embodied in each case as a cam of a camshaft driven by the crankshaft 43.

Preferably the internal combustion engine 1 may comprise a device 34 for variable activation of the inlet valve(s) 30 and a device 35 for variable activation of the exhaust valve(s) 31. This allows a valve overlap of inlet 30 and exhaust valve 31 to be adjusted within certain limits during of the operation of the internal combustion engine 1, so that it is possible for example to flush the cylinder 40 with fresh air L during the operation of the internal combustion engine 1. The respective device 34, 35 for variable activation of the inlet 30 and of the exhaust valve 31 is accordingly activated by the control device 60.

An injection valve 32 for injecting fuel K projects into the combustion chamber 50 of the internal combustion engine 1. If the internal combustion engine 1 is embodied as an otto engine, this engine further features a spark plug 33 projecting into the combustion chamber 50. With a diesel engine the spark plug 33 is omitted.

The exhaust valve 31, after activation by the camshaft, opens the exhaust tract 5 of the internal combustion engine 1, which allows the combustion gas and residues present in the combustion chamber 50 to leave the engine block 3. In this case they pass, as already mentioned above, the turbine 12, which drives the compressor 11 of the exhaust gas turbocharger 10.

At low engine speeds n of the internal combustion engine 1, e.g. if driver accelerates hard, the turbocharger 10 exhibits what is known as a turbo lag during acceleration of the vehicle. This turbo lag results from low mass throughputs in the exhaust tract 5 of the internal combustion engine 1, which do not enable the turbine 12 to initially provide enough power for the compressor 11. If sufficient power is subsequently available for the compressor 11, the effect of the turbocharger 10 can cut in suddenly.

This turbo lag can be reduced by scavenging the cylinder 40. In addition there are other operating states of the internal combustion engine 1 in which scavenging of the cylinder 40 can be sensible.

A problem in the operating states of the internal combustion engine 1 with scavenging of the cylinder 40 with fresh air L is that it is not known to an engine management device 60, e.g. the control device 60, how great a mass $m_{L,40}$ of air L remains or is trapped for a subsequent combustion in the cylinder 40, in order to burn this air L for a subsequent combustion process or cycle with an optimum mass $m_{K,opt}$ or an optimum injection mass $m_{K,opt}$ of fuel K.

The method involves determining or calculating the mass $m_{L,40}$ of air L or fresh air L remaining in the cylinder 40 after a scavenging process.

According to various embodiments, on the one hand a mass $M_{üL}$ of a scavenging air ÜL is determined which has just been scavenged through the cylinder 40. I.e. the scavenging air ÜL is that air L, which enters into the cylinder 40 and which also leaves this again.

On the other hand the method determines a trapping efficiency α of the cylinder 40, which is a measure of how much of the total fresh air L scavenged into the cylinder 40 remains in the cylinder 40, i.e. is trapped therein.

The trapping efficiency α is defined as follows: $\alpha=m_{L,40}/m_{L,40,ein}$. In this case $m_{L,40}$ is that mass m of air L, which was contained in the cylinder 40 or drawn into it, $m_{L,40,ein}$ is that mass m of air L which entered the cylinder 40 (see above).

The ratio $a=m_{L,40}/m_{L,40,ein}$ of these air masses $m_{L,40}$, $m_{L,40,ein}$ is well suited for characterizing a scavenging effect of the cylinder 40. That mass $m_{L,40,ein}$ of air L which flows out of the induction manifold 22 into the cylinder 40 during scavenging is known. This mass $m_{L,40,ein}$ may preferably be determined on the basis of a model with the aid of the pressure sensor 25, or with the aid of another sensor 25. It is not known however how much air L also leaves the cylinder 40 again.

Typical for internal combustion engines 1 is a dependency of the output torque $M_1$ over a Lambda value λ of the internal combustion engine 1. With a very rich mixture the predetermined torque $M_1$ is relatively small and an efficiency of the internal combustion engine 1 is correspondingly low. As the mixture is made leaner down to a certain point the efficiency of the internal combustion engine 1 improves and rises to a maximum torque $M_{1,opt}$. As the mixture is further weakened, the efficiency of the internal combustion engine 1 falls again.

According to various embodiments, an efficiency curve $\eta_{kL,M1}$ is now created for the torque $M_1$ of the internal combustion engine 1 for those operating points BP of the internal combustion engine 1 in which a scavenging of the cylinder 40 with air L occurs. I.e. the efficiency curve $\eta_{kL,M1}$ is drawn as a function of the varying Lambda value λ, with the speed n of the internal combustion engine 1 being recorded.

Figure 2:
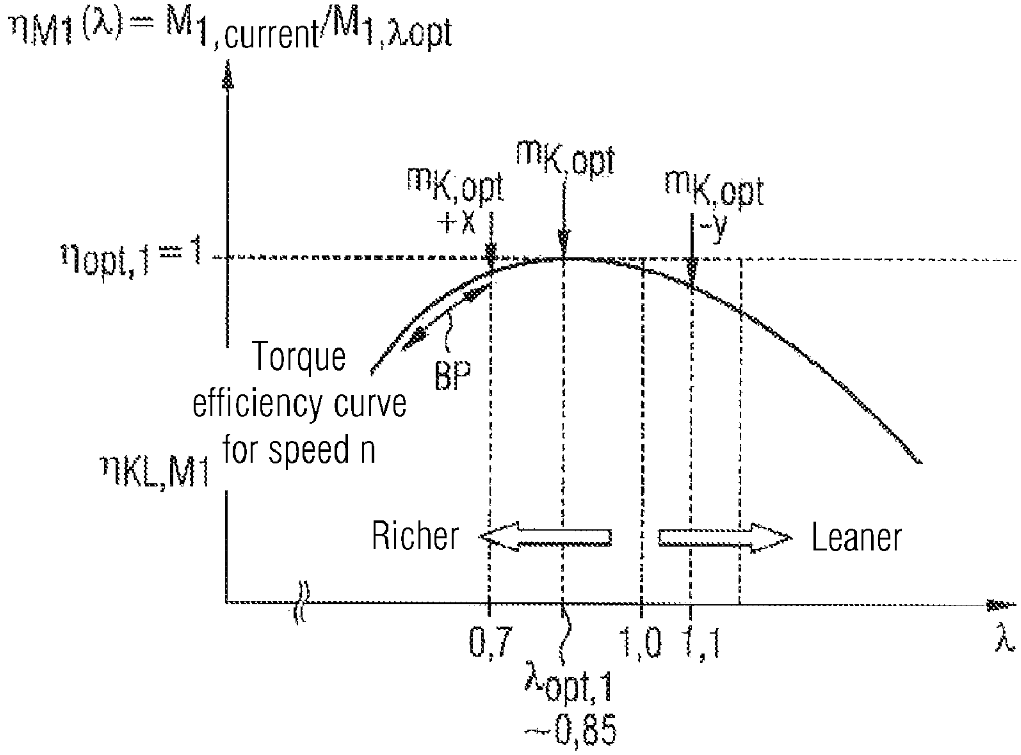
FIG. 2 an efficiency curve determined by a method for a created torque of the internal combustion engine depending on a Lambda value according to an embodiment.

FIG. 2 shows a possible diagram of such an efficiency curve $\eta_{kL,M1}$ over the Lambda value λ. In this case, for a defined speed n of the internal combustion engine 1, the efficiency $\eta_{M1}$ (λ) of the internal combustion engine 1 is plotted in relation to an optimum or highest torque $M_{1,opt}$, with the optimum or highest torque $M_{1,\lambda opt}$ establishing the optimum Lambda value $\lambda_{opt}$ determined by this method. The relationship to the optimum torque $M_{1,\lambda opt}$ allows the efficiency curve $\eta_{kL,M1}$ to be normalized and to be at its maximum for the value 1.

An optimum injection volume $m_{K,opt}$ for the internal combustion engine 1 is now determined from this for the relevant speed n. For this injected optimum fuel mass $m_{K,opt}$ the instantaneous almost flat optimum Lambda value $\lambda_{opt,1}$ which for the scavenging processes mostly lies at around 0.85 is produced from the torque efficiency curve $\eta_{kL,M1}$.

When the method is executed, depending on which side of the maximum of the torque efficiency curve $\eta_{KL,M1}$ one is located, more or less fuel mass $m_K$ than the optimum fuel volume $m_{K,opt}$ is injected.

If, as shown, the optimum Lambda value $\lambda_{opt,1}$ is at 0.85, with a richer mixture, e.g. for a Lambda value λ=0.7, more fuel x is injected as the optimum fuel mass $m_{K,opt}$. I.e. in this example, for the Lambda value λ=0.7 a fuel mass $m_{K,opt}$+x is injected.

A similar result is produced by a leaner mixture, for which in this example the Lambda value of λ=1.1 was selected. In this case an injected fuel mass produces $m_{K,opt}$−y. i.e. a mass $m_{K,opt}$−y of fuel K is injected which is reduced by the amount y of the optimum fuel mass $m_{K,opt}$.

This means that it is now known for what injected fuel mass $m_{K,opt}$ the highest or optimum or maximum torque $M_{1,opt}$ was developed by the internal combustion engine 1.

This enables a curve or an engine map of the engine management device 60 to be correspondingly adapted for the relevant engine speed n. According to various embodiments, it is known which Lambda value λ has prevailed for a specific operating point BP for a previous scavenging of the cylinder 40 in the combustion chamber 50. This is the instantaneous optimum Lambda value $\lambda_{opt,1}$.

With knowledge of the optimum fuel mass $m_{K,opt}$ injected or to be injected it is possible to determine the original mass $m_{L,40}$ of air L present in the cylinder 40 and from this to determine the scavenging air mass $m_{üL}$ and the trapping efficiency α.

The air L flowing into the cylinder 40 is known (see above). By forming a difference ($m_{L,40,ein}$ $m_{L,40}$) between the inflow air mass $m_{L,40,ein}$ and the air mass $m_{L,40}$ remaining in the cylinder 40 the mass $m_{ÜL}$ of scavenging air ÜL can be determined. For the quotient ($m_{L,40}/m_{L,40,ein}$) of the air mass $m_{L,40}$ contained in the cylinder 40 and the inflowing total air mass $m_{L,40,ein}$ (alternative to the latter: scavenging air mass $m_{üL}$) the trapping efficiency α—as defined above—is determined.

Figure 3:
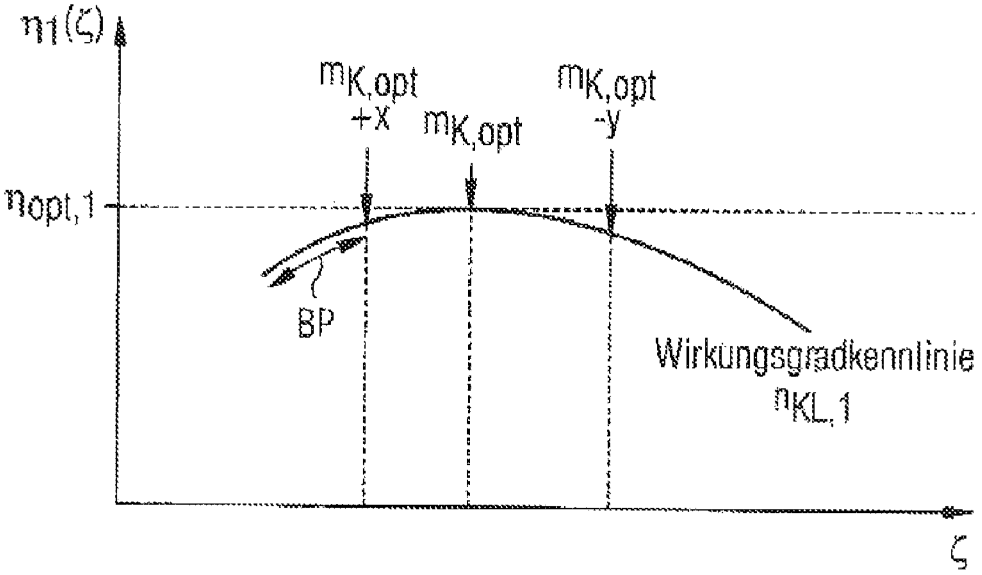
FIG. 3 a general efficiency curve determined by the method according to an embodiment.

According to various embodiments, the method is not only able to be executed based on the torque $M_1$ of the internal combustion engine 1 and based on the Lambda value λ. This is shown in greater detail in FIG. 3, which shows a similar method of operation based on an efficiency $\eta_1(\zeta)$ of the internal combustion engine 1 as a function of a variable parameter of the internal combustion engine 1.

In this case the variable parameter ζ can be a fuel mass $m_K$ or a fuel volume $m_K$ for example. The efficiency curve $\eta_{KL,1}$ thus produced in this case, as detailed above for example, can represent the torque $M_1$ created by the internal combustion engine 1. It is however possible not to plot the created torque $M_1$ but another parameter which represents the efficiency $\eta_1$ of the internal combustion engine. This can be a process efficiency or a power of the internal combustion engine 1 for example.

What is claimed is:

1. A method for determining at least one of a trapping efficiency and a scavenging air mass of an internal combustion engine, the method comprising the steps of:

for operating points in which a scavenging of a cylinder of the internal combustion engine occurs, creating an efficiency curve of the internal combustion engine as a function of an injection mass in the cylinder, on the basis of the efficiency curve, determining an optimum injection mass at an optimum efficiency of the internal combustion engine, which is a measure of the trapping efficiency or a measure of the scavenging air mass of the internal combustion engine;

determining an inlet air mass using one or more sensors; and calculating an air mass contained in the cylinder based at least on the determined optimum injection mass and the determined inlet air mass.

2. The method according to claim 1, wherein the optimum efficiency of the internal combustion engine being an extreme or the absolute maximum, of the efficiency curve.

3. The method according to claim 2, wherein the efficiency curve of the internal combustion engine being created for a specific speed of the internal combustion engine.

4. The method according to claim 1, wherein, for a relevant optimum operating point of the internal combustion engine, an optimum Lambda value being computed through the optimum injection mass.

5. The method according to claim 1, wherein the scavenging air mass of the internal combustion engine being determined from a difference between the air mass flowing into the cylinder and an air mass contained in the cylinder.

6. The method according to claim 5, wherein air mass flowing into the cylinder being determined by a sensor.

7. The method according to claim 5, wherein air mass flowing into the cylinder being determined model-based by a pressure sensor.

8. The method according to claim 1, wherein the trapping efficiency of the internal combustion engine being determined from a ratio of the air mass contained in the cylinder and air mass flowing into the cylinder or the scavenging air mass.

9. The method according to claim 1, wherein the efficiency curve of the internal combustion engine being created as a function of a variable parameter of the internal combustion engine.

10. The method according to claim 1, wherein the efficiency curve of the internal combustion engine being created as a function of an output of the internal combustion engine.

11. The method according to claim 1, wherein the efficiency curve of the internal combustion engine being created as a function of a Lambda value of the internal combustion engine.

12. The method according to claim 1, wherein the efficiency curve of the internal combustion engine being created on the basis of a torque generated by the internal combustion engine.

13. The method according to claim 1, wherein the efficiency curve of the internal combustion engine being generated as a function of a torque generated by the internal combustion engine and an optimum torque of the internal combustion engine.

14. The method according to claim 1, wherein an optimum torque of the internal combustion engine being defined as an optimum Lambda value for the optimum operating point.

15. The method according to claim 1, wherein at least one of a Lambda value and an optimum Lambda value of the internal combustion engine vary depending on an operating point of the internal combustion engine.

16. The method according to claim 1, wherein the internal combustion engine comprises a supercharger or a turbocharger or a compressor.

17. The method according to claim 1, wherein the internal combustion engine comprises at least one of: a device for variable activation of an inlet valve and a device for variable activation of an exhaust valve.

18. The method according to claim 1, wherein the air mass contained in the cylinder is determined without analyzing an exhaust gas of the internal combustion engine.

19. A method for determining a trapping efficiency and a scavenging air mass of an internal combustion engine, the method comprising the steps of:

for operating points in which a scavenging of a cylinder of the internal combustion engine occurs, creating an efficiency curve of the internal combustion engine as a function of an injection mass in the cylinder, on the basis of the efficiency curve, determining an optimum injection mass at an optimum efficiency of the internal combustion engine, which is a measure of the trapping efficiency and a measure of the scavenging air mass of the internal combustion engine; and determining an inlet air mass using one or more sensors; and calculating an air mass contained in the cylinder based at least on the determined optimum injection mass and the determined inlet air mass.

20. A device for determining at least one of a trapping efficiency and a scavenging air mass of an internal combustion engine, the device being operable to:

create, for operating points in which a scavenging of a cylinder of the internal combustion engine occurs, an efficiency curve of the internal combustion engine as a function of an injection mass in the cylinder, determine, on the basis of the efficiency curve, an optimum injection mass at an optimum efficiency of the internal combustion engine, which is a measure of the trapping efficiency or a measure of the scavenging air mass of the internal combustion engine; and determine an inlet air mass based on data from one or more sensors; and calculate an air mass contained in the cylinder based at least on the determined optimum injection mass and the determined inlet air mass.

* * * * *